(12) United States Patent
Yu et al.

(10) Patent No.: US 11,374,767 B2
(45) Date of Patent: Jun. 28, 2022

(54) KEY-BASED AUTHENTICATION FOR BACKUP SERVICE

(71) Applicant: EMC IP Holding Company LLC, Hopkinton, MA (US)

(72) Inventors: Jing Yu, Shanghai (CN); Ming Zhang, Shanghai (CN); Kunal Ruvala, Mumbai (IN); Xiaoliang Zhu, Shanghai (CN); Min Liu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 604 days.

(21) Appl. No.: 16/246,619

(22) Filed: Jan. 14, 2019

(65) Prior Publication Data
US 2020/0228343 A1 Jul. 16, 2020

(51) Int. Cl.
| | |
|---|---|
| *H04L 9/32* | (2006.01) |
| *G06F 9/455* | (2018.01) |
| *H04L 9/30* | (2006.01) |
| *G06F 11/14* | (2006.01) |
| *H04L 9/40* | (2022.01) |

(52) U.S. Cl.
CPC ........ *H04L 9/3247* (2013.01); *G06F 9/45558* (2013.01); *G06F 11/1464* (2013.01); *G06F 11/1469* (2013.01); *H04L 9/30* (2013.01); *H04L 9/3213* (2013.01); *H04L 63/0853* (2013.01); *H04L 63/166* (2013.01); *G06F 2009/45583* (2013.01); *G06F 2009/45595* (2013.01); *G06F 2201/815* (2013.01)

(58) Field of Classification Search
CPC ....... H04L 9/3247; H04L 9/30; H04L 9/3213; H04L 63/0853; H04L 63/166; G06F 9/45558; G06F 11/1464; G06F 11/1469; G06F 2009/45583; G06F 2009/45595; G06F 2201/815
See application file for complete search history.

(56) References Cited

U.S. PATENT DOCUMENTS

| | | | |
|---|---|---|---|
| 2014/0068258 A1* | 3/2014 | Chao | G06F 11/1469 713/167 |
| 2016/0055064 A1* | 2/2016 | Gostev | G06F 21/629 726/4 |
| 2016/0364577 A1* | 12/2016 | Williams | H04L 63/083 |

(Continued)

FOREIGN PATENT DOCUMENTS

CN 105245334 A * 1/2016

*Primary Examiner* — Michael R Vaughan
(74) *Attorney, Agent, or Firm* — Womble Bond Dickinson (US) LLP (57) ABSTRACT

A method and system for performing authentication for a backup service provided by a server is provided. The method receives a request for authentication from a client device, the request for authentication including a signature generated using a private key. The method sends a request to obtain a public key corresponding to the private key to the server and receives the public key from the server, the public key being retrieved by the server from a backup of a virtual machine. The method verifies the signature using the public key and generates a token encrypted using the public key, the token enabling the client device to access the server for the backup service. The method sends the token to the client device, the token to be decrypted using the private key by the client device.

20 Claims, 5 Drawing Sheets

(56) References Cited

U.S. PATENT DOCUMENTS

| | | | |
|---|---|---|---|
| 2017/0163629 A1* | 6/2017 | Law | H04L 63/0435 |
| 2020/0042397 A1* | 2/2020 | Yu | G06F 9/45558 |
| 2021/0049301 A1* | 2/2021 | Gregori | H04L 63/0281 |

* cited by examiner

KEY-BASED AUTHENTICATION FOR BACKUP SERVICE

TECHNOLOGICAL FIELD

The present disclosure relates generally to authentication for backup service, and in particular, to key-based authentication for backup service such as file level restore (FLR) service or granular level restore (GLR) service.

BACKGROUND

Data protection capability becomes more and more important when the enterprises evaluate the solutions from the cloud service providers. One important capability is to provide file level restore (FLR) service or granular level restore (GLR) service on virtual machine (VM) image-level backups for users. FLR brings the capability to restore individual files in the virtual disks from the image-level VM backup without restoring the entire VM or whole disk. GLR brings the capability to restore individual data records or data items in the virtual disks from the image-level VM backup without restoring the entire VM or whole disk. Self-service FLR/GLR enables a user of a VM (with an account in the VM) to perform FLR/GLR on the backup of the user's own VM. The user needs to be authenticated to access the FLR/GLR service provided by a server.

Many FLR/GLR servers provide only password-based authentication. For example, a user may be asked to input a username and password in an Internet browser. The username and password can be sent to the FLR/GLR server to verify the username and password. However, many cloud service providers (e.g., AWS and Azure) may only use key-based authentication. Password-based authentication is disabled by many cloud service providers. For security reason, a user should never send a private key to other parties like AWS or Azure. Thus, it would be desired to allow a user to use private key for authentication to access the FLR/GLR service provided by a FLR/GLR server.

Therefore, it would be desirable to have a system and method that takes into account at least some of the issues discussed above, as well as other possible issues.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Example implementations of the present disclosure are directed to key-based authentication for backup service such as file level restore (FLR) service or granular level restore (GLR) service. A user can be authenticated to access the FLR/GLR service without using the password-based authentication. That is, the user will not be asked to provide a username and password to the FLR/GLR server to verify the username and password to allow the user to access the FLR/GLR service.

The present disclosure thus includes, without limitation, the following example implementations.

Some example implementations provide a method of performing authentication for a backup service provided by a server, the method comprising: receiving a request for authentication from a client device, the request for authentication including a signature generated using a private key; sending a request to obtain a public key corresponding to the private key to the server; receiving the public key from the server, the public key being retrieved by the server from a backup of a virtual machine; verifying the signature using the public key; generating a token encrypted using the public key, the token enabling the client device to access the server for the backup service; and sending the token to the client device, the token to be decrypted using the private key by the client device.

In some example implementations of the method of any preceding example implementation, or any combination of preceding example implementations, the backup service includes FLR service or GLR service on the backup of the virtual machine.

In some example implementations of the method of any preceding example implementation, or any combination of preceding example implementations, receiving the request for authentication includes receiving the request for authentication over transport layer security (TLS) protocol.

In some example implementations of the method of any preceding example implementation, or any combination of preceding example implementations, the request for authentication also includes information for authentication, and the signature is generated using the private key and the information for authentication.

In some example implementations of the method of any preceding example implementation, or any combination of preceding example implementations, the information for authentication includes at least: a username, a backup identification (ID), the public key, a timestamp of the client device, and a digest algorithm.

In some example implementations of the method of any preceding example implementation, or any combination of preceding example implementations, the request for authentication does not include a password associated with the username.

In some example implementations of the method of any preceding example implementation, or any combination of preceding example implementations, verifying the signature includes verifying the signature to determine that the client device has the private key.

Some example implementations provide an apparatus for performing authentication for a backup service provided by a server. The apparatus comprises a processor and a memory storing executable instructions that, in response to execution by the processor, cause the apparatus to at least perform the method of any preceding example implementation, or any combination of any preceding example implementations.

Some example implementations provide a computer-readable storage medium for performing authentication for a backup service provided by a server. The computer-readable storage medium is non-transitory and has computer-readable program code stored therein that in response to execution by a processor, causes an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Figure 1:
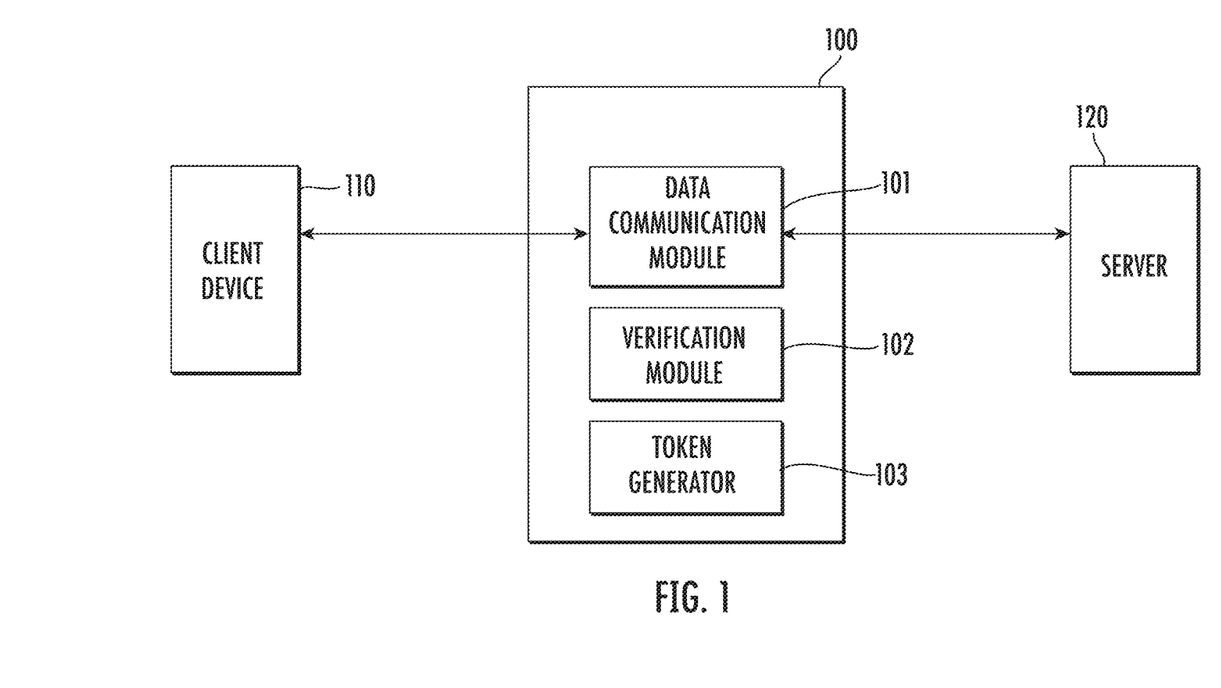
FIG. 1 illustrates a system for performing authentication for a backup service, according to example implementations of the present disclosure.

FIG. 1 illustrates a system 100 performing authentication for a backup service, according to example implementations of the present disclosure. The backup service can be provided by a server 120. In some implementations, the backup service includes FLR service or GLR service on a backup of a virtual machine. The server can be a FLR/GLR server providing the FLR/GLR service. In some examples, as described in greater detail with reference to FIG. 5, the system may be implemented by an apparatus that includes a processor and a memory storing executable instructions.

As shown, the system 100 includes any of a number of different subsystems (each an individual system) for performing one or more functions or operations. As shown, in some examples, the system includes one or more of each of a data communication module 101, a verification module 102 and a token generator 103. The subsystems may be co-located or directly coupled to one another, or in some examples, various ones of the subsystems may communicate with one another across one or more computer networks. Further, although shown as part of the system, it should be understood that any one or more of the data communication module, verification module or token generator may function or operate as a separate system without regard to any of the other subsystems. Sit should also be understood that the system may include one or more additional or alternative subsystems than those shown in FIG. 1. In one implementation, the system is deployed in a cloud environment and may be deployed in a server of the cloud service provider.

In some implementations, the data communication module 101 is configured to receive a request for authentication from a client device 110. The client device can be a computer used by a user of the backup service provided by the server 120. The request for authentication includes a signature generated using a private key. The client device possesses the private key. In some implementations, the request for authentication also includes information for authentication, and the signature is generated using the private key and the information for authentication. Generating the signature will be described with greater details with reference to FIG. 2 below.

In some implementations, the data communication module 101 is configured to receive the request for authentication over transport layer security (TLS) protocol. For example, the client device 110 can send the request for authentication to the data communication module thorough an Internet browser using HyperText Transfer Protocol (HTTP).

In some implementations, the data communication module 101 is configured to send a request to obtain a public key corresponding to the private key to the server 120 and receive the public key from the server. Data encrypted by the public key can only be decrypted by the corresponding private key. The public key is retrieved by the server from a backup of a virtual machine. In some examples, the backup service includes FLR service or GLR service on the backup of the virtual machine.

In some implementations, the information for authentication included in the request for authentication includes at least: a username of the user, a backup ID indicating the backup of the virtual machine, the public key, a timestamp of the client device, and a digest algorithm. In one example, the user can use the username in the virtual machine when the backup of the virtual machine was taken. In these implementations, the request for authentication does not include a password associated with the username. That is, the request for authentication is not password-based.

After receiving the public key from the server 120, in some implementations, the verification module 102 is configured to verify the signature using the public key. In these implementations, the verification module is configured to verify the signature to determine that the client device 110 has the private key. After the signature is verified, in some implementations, the token generator 103 is configured to generate a token encrypted using the public key. The token enables the client device to access the server 120 for the backup service. For example, the token enables the client device to access the server to browse and/or download individual files or individual data records in the backup of the virtual machine.

In some implementations, the token generator can provide the token to the data communication module 101, and the data communication module is configured to send the token to the client device 110. The token is to be decrypted using the private key by the client device. The token can be encrypted by the public key, and the encrypted token can only be decrypted by the corresponding private key, i.e., the private key possessed by the client device.

Figure 2:
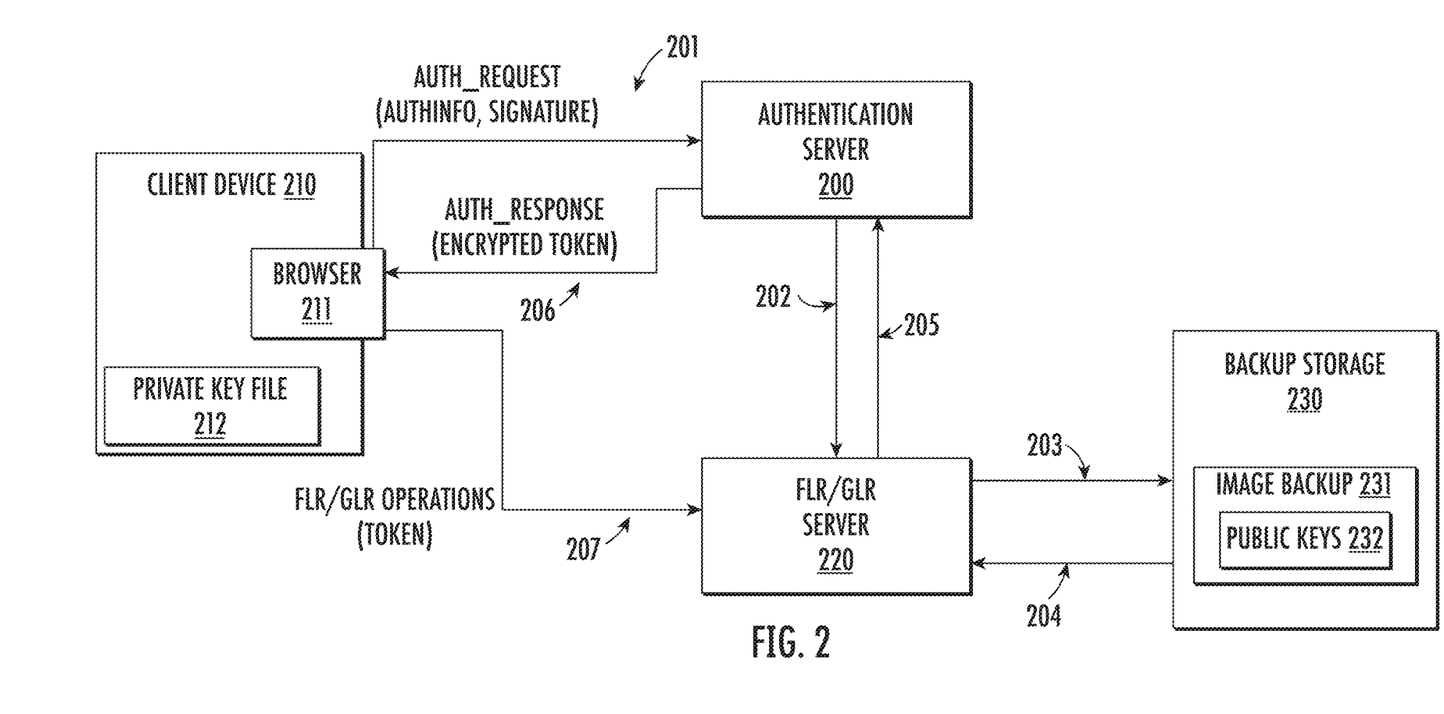
FIG. 2 illustrates a process of performing authentication for a backup service, according to example implementations.

FIG. 2 illustrates a process of performing authentication for a backup service, according to example implementations. As shown, the client device 210 includes a browser 211 and a private key file 212 storing a private key. The client device 210 may correspond to the client device 110 in FIG. 1. A user of the client device 210 can input a username and a path to the private key via the browser. In one example, the private key may be encrypted to generate a passphrase if needed. In this example, the user needs to input the passphrase as well.

The information for authentication (also referred to as "AuthInfo") can be collected at the client device 210. The information for authentication may include a username from the user's input. The information for authentication may include one or more backup IDs indicating the backup(s) to perform FLR or GLR. The information for authentication may include a public key that can be extracted from a key file. The information for authentication may include a time stamp of the client device indicating the current time of the client device. The information for authentication may include or specify a digest algorithm such as the secure hash algorithm (SHA) 256 algorithm.

The client device 210 can calculate a signature of the information for authentication ("AuthInfo") using the private key stored in the private key file 212 and the digest algorithm. Then the client device can send the information for authentication ("AuthInfo") together with the signature in a request for authentication message (also referred to as "AUTH_REQUEST") to the authentication server 200, as indicated by arrow 201. The authentication server 200 may correspond to the system 100 in FIG. 1.

After receiving the request for authentication message, the authentication server 200 can request the FLR/GLR server 220 to obtain one or more public keys, as indicated by arrow 202. The FLR/GLR server 220 may correspond to the serve 120 in FIG. 1. After receiving the request for one or more public keys, the FLR/GLR server 220 can access the backup storage 230, as indicated by arrow 203. The backup storage can include an image backup 231 of a virtual machine that includes a file 232 storing one or more public keys. The FLR/GLR server 220 can read the file 232 and retrieve one or more public keys from the image backup of the virtual machine, as indicated by arrow 204. Then the FLR/GLR server 220 can provide the obtained one or more public keys to the authentication server, as indicated by arrow 205. In one example, the authentication server can get a file from the FLR/GLR server 220, and the file includes one or more public keys.

After receiving the public keys from the FLR/GLR server 220, the authentication server 200 can verify the signature included in the request for authentication ("AUTH_REQUEST"). The authentication server can use the public keys to verify the signature. If any one of the public keys can verify the signature, the authentication server can know that the client device 210 has the private key (stored in the private key file 212) corresponding to the public key used to verify the signature. In another example, the information for authentication ("AuthInfo") includes a specified public key, thus the authentication server can search if the received public keys include the specified public key and use that specified public key to verify the signature, i.e., determine that the client device has the private key corresponding to the specified public key.

After the signature is verified, the authentication server 200 can generate a token encrypted using the public key that verifies the signature. The token can enable the client device 210 to access the FLR/GLR server 220 for the backup service. The authentication server can send a response message (also referred to as "AUTH_RESPONSE") including the encrypted token to the client device, as indicated by arrow 206. After receiving the encrypted token, the client device can decrypt the encrypted token using the private key stored in the private key file 212. After the token is decrypted, the client device is authenticated and can perform the FLR/GLR operations in a session using the token. For example, the client device can access the FLR/GLR server to browse and/or download individual files or individual data records in the image backup 231 of the virtual machine, as indicated by arrow 207.

In one example, after receiving the request for authentication ("AUTH_REQUEST") from the client device 210, the authentication server 200 can use the information for authentication ("AuthInfo") for authentication. The authentication server can check the timestamp included in the information for authentication and deny the request for authentication if the timestamp indicates a time of the client device that exceeds a predefined threshold. Based on the username included in the information for authentication, the authentication server can extract the correct "authorized keys" from the corresponding backup based on the backup ID included in the information for authentication. The authentication server can check if the public key corresponding to private key stored in the private key file 212 exists, and deny the request for authentication if the public key does not exist. If the public key exists, the authentication server can verify the signature against the "AuthInfo" with the public key. If the signature is not verified, the authentication server can deny the request for authentication. If the request for authentication is denied, the authentication server can send an error message to the client device.

Figure 3:
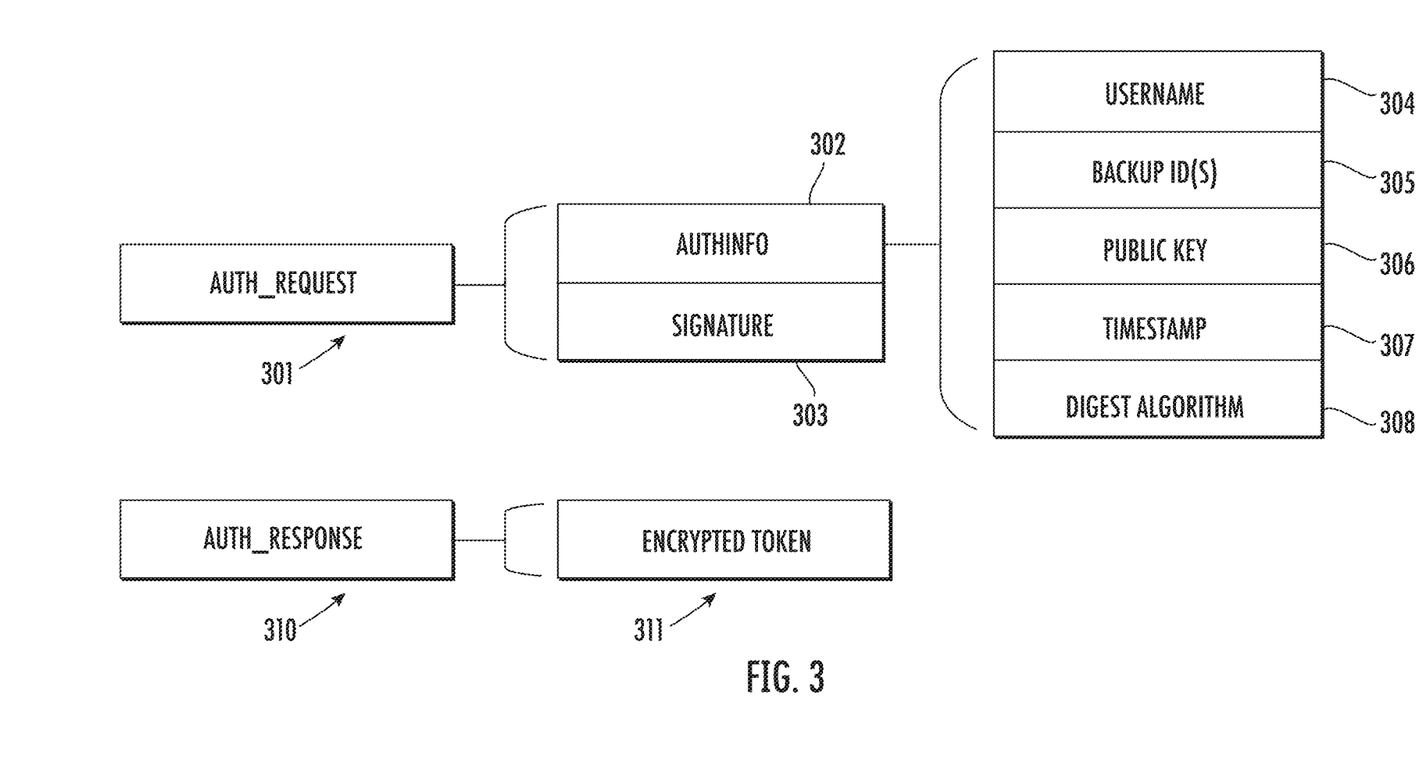
FIG. 3 illustrates message contents in a request for authentication and a response to authentication, according to example implementations.

FIG. 3 illustrates message contents in a request for authentication and a response to authentication, according to example implementations. As shown, the request for authentication ("AUTH_REQUEST") 301 includes two parts: information for authentication ("AuthInfo") 302 and signature 303. Similarly as explained above, the information for authentication ("AuthInfo") may include a username 304 of the user, backup ID(s) 305 indicating the backup(s) of the virtual machine, the public key 306, a timestamp 307 of the client device, and a digest algorithm 308. The response to authentication ("AUTH_RESPONSE") 310 includes the encrypted token 311.

Figure 4:
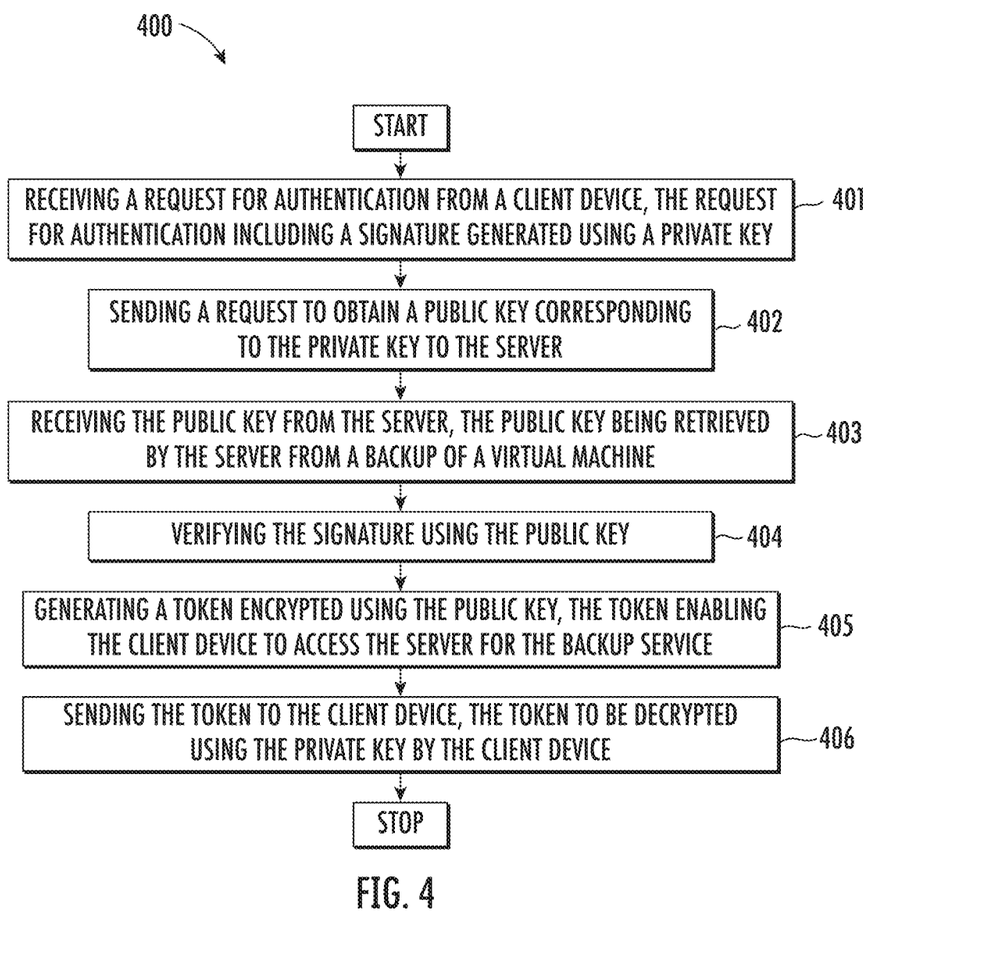
FIG. 4 is a flowchart illustrating various operations in a method of performing authentication for a backup service, according to various example implementations.

FIG. 4 is a flowchart illustrating various operations in a method 400 of performing authentication for a backup service provided by a server, according to various example implementations. At block 401, the method includes receiving a request for authentication from a client device, the request for authentication including a signature generated using a private key. At block 402, the method includes sending a request to obtain a public key corresponding to the private key to the server. At block 403, the method includes receiving the public key from the server, the public key being retrieved by the server from a backup of a virtual machine. At block 404, the method includes verifying the signature using the public key. At block 405, the method includes generating a token encrypted using the public key, the token enabling the client device to access the server for the backup service. At block 406, the method includes sending the token to the client device, the token to be decrypted using the private key by the client device.

The present disclosure provides a simple and secure method for key-based authentication for self-service FLR/GLR. In one example, even if the HTTP link between the client device 210 and the authentication server 200 is not reliable, the authentication server can still authenticate the user and deliver the token securely using the key-based authentication. The signature in "AUTH_REQUEST" message can guarantee the integrity of "AuthInfo" in the message and can be used to verify if the client device possesses the private key. It is difficult to tamper the signature. The encryption of token in "AUTH_RESPONSE" message can guarantee that only the private key can decrypt the token and man-in-the-middle cannot decrypt the token.

According to example implementations of the present disclosure, the system 100 and its subsystems including the data communication module 101, verification module 102 and token generator 103 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 5:
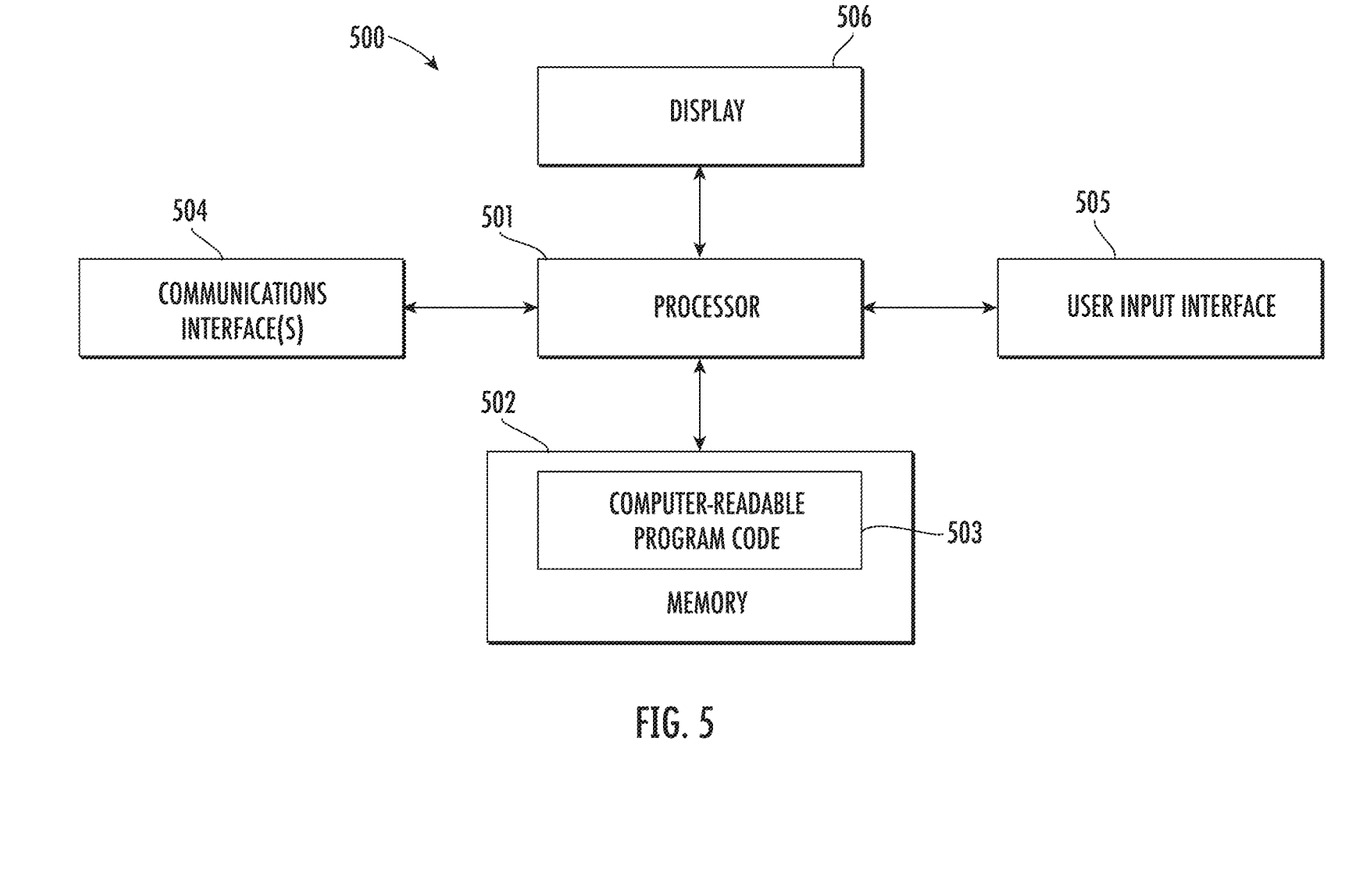
FIG. 5 illustrates an apparatus according to some example implementations.

FIG. 5 illustrates an apparatus 500 according to some example implementations. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 501 (e.g., processing circuitry) connected to a memory 502 (e.g., storage device). In some examples, the apparatus 500 implements the system 100.

The processor 501 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 502 (of the same or another apparatus).

The processor 501 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 502 is generally any piece of computer hardware that is capable of storing information such as, for example, data, computer programs (e.g., computer-readable program code 503) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 502, the processor 501 may also be connected to one or more interfaces for displaying, transmitting and/or receiving information. The interfaces may include a communications interface 504 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 506 and/or one or more user input interfaces 505 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like. In some examples, the user interfaces include the GUI 106.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 500 may include a processor 501 and a computer-readable storage medium or memory 502 coupled to the processor, where the processor is configured to execute computer-readable program code 503 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of performing authentication for a backup service provided by a server, the method comprising:
    receiving a request for authentication from a client device, the request for authentication including a signature generated using a private key;
    sending a request to obtain a public key corresponding to the private key to the server;
    receiving the public key from the server, the public key being retrieved by the server from a backup of a virtual machine;
    verifying the signature using the public key;
    generating a token encrypted using the public key, the token enabling the client device to access the server for the backup service; and
    sending the token to the client device, the token to be decrypted using the private key by the client device.

2. The method of claim 1, wherein the backup service includes file level restore (FLR) service or granular level restore (GLR) service on the backup of the virtual machine.

3. The method of claim 1, wherein receiving the request for authentication includes receiving the request for authentication over transport layer security (TLS) protocol.

4. The method of claim 1, wherein the request for authentication also includes information for authentication, and wherein the signature is generated using the private key and the information for authentication.

5. The method of claim 4, wherein the information for authentication includes at least: a username, a backup identification (ID), the public key, a timestamp of the client device, and a digest algorithm.

6. The method of claim 5, wherein the request for authentication does not include a password associated with the username.

7. The method of claim 1, wherein verifying the signature includes verifying the signature to determine that the client device has the private key.

8. An apparatus for performing authentication for a backup service provided by a server, the apparatus comprising a processor and a memory storing executable instructions that, in response to execution by the processor, cause the apparatus to at least:
    receive a request for authentication from a client device, the request for authentication including a signature generated using a private key;
    send a request to obtain a public key corresponding to the private key to the server;
    receive the public key from the server, the public key being retrieved by the server from a backup of a virtual machine;
    verify the signature using the public key;
    generate a token encrypted using the public key, the token enabling the client device to access the server for the backup service; and
    send the token to the client device, the token to be decrypted using the private key by the client device.

9. The apparatus of claim 8, wherein the backup service includes file level restore (FLR) service or granular level restore (GLR) service on the backup of the virtual machine.

10. The apparatus of claim 8, wherein the apparatus being caused to receive the request for authentication includes being caused to receive the request for authentication over transport layer security (TLS) protocol.

11. The apparatus of claim 8, wherein the request for authentication also includes information for authentication, and wherein the signature is generated using the private key and the information for authentication.

12. The apparatus of claim 11, wherein the information for authentication includes at least: a username, a backup identification (ID), the public key, a timestamp of the client device, and a digest algorithm.

13. The apparatus of claim 12, wherein the request for authentication does not include a password associated with the username.

14. The apparatus of claim 8, wherein the apparatus being caused to verify the signature includes being caused to verify the signature to determine that the client device has the private key.

15. A computer-readable storage medium for performing authentication for a backup service provided by a server, the computer-readable storage medium being non-transitory and having computer-readable program code stored therein that in response to execution by a processor, causes an apparatus to at least:
- receive a request for authentication from a client device, the request for authentication including a signature generated using a private key;
- send a request to obtain a public key corresponding to the private key to the server;
- receive the public key from the server, the public key being retrieved by the server from a backup of a virtual machine;
- verify the signature using the public key;
- generate a token encrypted using the public key, the token enabling the client device to access the server for the backup service; and
- send the token to the client device, the token to be decrypted using the private key by the client device.

16. The computer-readable storage medium of claim 15, wherein the backup service includes file level restore (FLR) service or granular level restore (GLR) service on the backup of the virtual machine.

17. The computer-readable storage medium of claim 15, wherein the apparatus being caused to receive the request for authentication includes being caused to receive the request for authentication over transport layer security (TLS) protocol.

18. The computer-readable storage medium of claim 15, wherein the request for authentication also includes information for authentication, and wherein the signature is generated using the private key and the information for authentication.

19. The computer-readable storage medium of claim 18, wherein the information for authentication includes at least: a username, a backup identification (ID), the public key, a timestamp of the client device, and a digest algorithm.

20. The computer-readable storage medium of claim 19, wherein the request for authentication does not include a password associated with the username.

* * * * *